Sept. 14, 1948.　　　W. J. O'BRIEN　　　2,449,175
RADIO DIRECTION FINDER
Filed July 24, 1944　　　　　　　　　　2 Sheets-Sheet 1

INVENTOR.
WILLIAM J. O'BRIEN,
By
ATTORNEY.

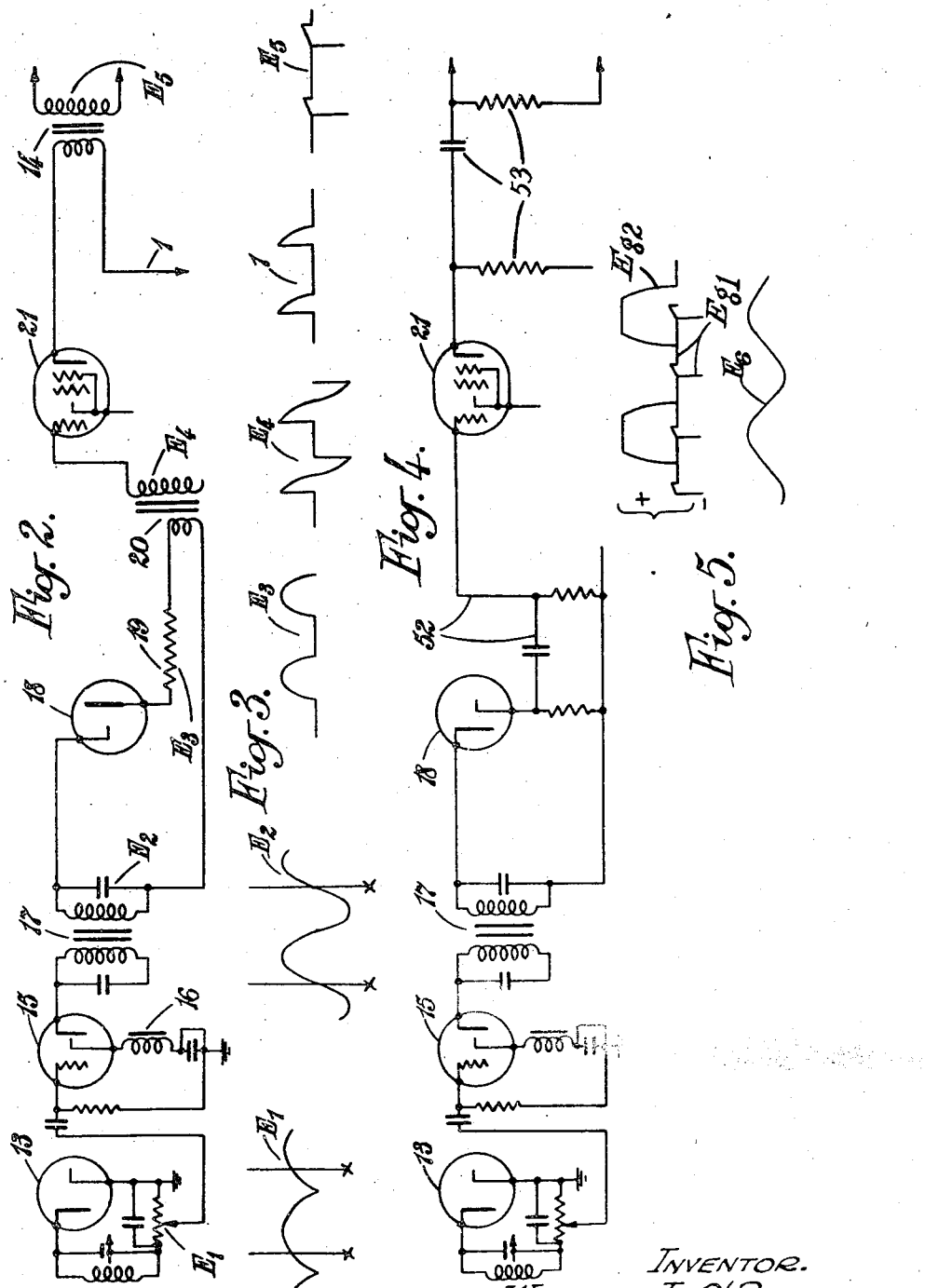

Patented Sept. 14, 1948

2,449,175

UNITED STATES PATENT OFFICE 2,449,175

RADIO DIRECTION FINDER

William Joseph O'Brien, London, England, assignor to The Decca Record Company, Limited, London S. W. 9, England, a corporation of Great Britain Application July 24, 1944, Serial No. 546,248
In Great Britain May 13, 1943

Section 1, Public Law 690, August 8, 1946
Patent expires May 13, 1963

5 Claims. (Cl. 343—121)

This invention relates to radio direction finders and has for an object to provide an arrangement which is as far as possible automatic in operation.

According to this invention, a radio direction finder comprises two fixed receiving antennae arranged with their directional properties in a required angular relationship, two electronic devices, means for applying high-frequency signal potentials built up in the two antennae respectively to the control electrodes of said electronic devices, means for generating two low-frequency A. C. signals of identical frequency but out-of-phase to a degree corresponding to said angular relationship of the two antennae, means for applying the two out-of-phase A. C. signals respectively to said electronic devices so as to modulate the high-frequency signals, each of which electronic devices is arranged to provide a reversal of phase of the modulated signal due to reversal of polarity of the applied A. C. signal, means for combining the resulting out-of-phase modulated outputs of the electronic device, and feeding the combined signals to an analysing device which is arranged to indicate the phase shift of the peaks or depressions in the resultant waves produced by changes of direction of the incoming high-frequency signals.

One form of electronic device for producing a reversal of phase at predetermined points in the applied A. C. cycle may comprise two electronic multi-grid valves and means either for feeding an input grid of each valve on the push-pull principle, while connecting their output electrodes in parallel, or with means for connecting their input grids in parallel and feeding their output electrodes on the push-pull principle, and means for connecting another grid to one of said low-frequency A. C. supply.

There may also be associated with the means for supplying the A. C. signal in out-of-phase relationship to two electronic devices, means such as tuned resonant circuits for filtering out any harmonics which may be present in the A. C. supply.

The required phase relationship between the two applied low-frequency A. C. signals may be provided by two coupled resonant circuits of which the primary is energised by a source of A. C. supply.

The resulting combined signal may be amplified by a superheterodyne receiver before being passed to the analysing device.

The aforesaid device for analysing the combined signal of the two electronic devices may comprise a gas-discharge tube having ionisation control elements connected by a suitable circuit with the combined output of the two electronic devices so as to produce ionisation voltage surges at varying phase-time points in said combined signal according to the relative amplitude of the two high-frequency signals, and means driven in synchronism with the A. C. supply and illuminated by the gas-discharge tube so as to indicate in a stroboscopic manner the position of the surges in each cycle.

It is desirable that the surges of potential applied to the gas-discharge tube shall be as sharp as possible, whereas the form of wave resulting from the combined signals of the two electronic devices as amplified by the receiver will be of a continuous sinuous form and may include unwanted peaks due to stray signals or atmospheric disturbances.

In order to provide the required potential surges there is arranged between the receiver for the aforesaid combined signals and the input of the gas-discharge tube a circuit embodying a detector valve circuit arranged to demolulate the radio frequency signal of the receiver, thereby producing a low-frequency signal of continuous form and of single polarity, which wave is passed through a second circuit embodying an amplifier and a filter circuit which passes the required A. C. frequency, but eliminates the statics, thereby producing a double polarity sinuous wave, which wave is passed through a third circuit embodying a detector which provides a single polarity interrupted wave of rounded form, which latter circuit is coupled with a fourth circuit through a differentiating circuit embodying a transformer and amplifier, which converts the interrupted rounded wave into a double polarity interrupted wave having sharp cut-off points at the commencement and on the end of each half-cycle joined by a curve with inflections, which wave is passed through a valve biassed to cut-off point so as to eliminate the half-waves of one polarity and finally the resultant interrupted half-waves are passed through another differentiating circuit which converts these half-waves to fine hair-line surges.

The form of wave provided by the combined outputs of the two first said electronic devices is similar to that resulting from a rotating search coil of a goniometer operating on the Bellini-Tosi system, that is to say, two identical surges are produced during one complete revolution of the search coil, and thus it is not possible to ascertain the sense of an incoming signal. For example, a signal along a meridian might either be coming from the North or South. The frequency of the combined signals provided by the two electronic devices is double that of the A. C. supply. Thus, if alternate peaks can be eliminated, a single surge will be applied to the recording device for each cycle of the A. C. supply. It will be appreciated that the combined signal from the two electronic devices is made up of two components in out-of-phase relationship. Thus, if the effect of one of these components can be eliminated, the required response of the indicator will be obtained. This elimination is effected by means of a sense antenna and associated circuit. As is known, an open antenna arranged in close proximity to the antennae with the aforesaid directional properties will receive a signal which is 90° out-of-phase with both the signals received by the other two aerials. Thus, if the phases of these two latter signals are shifted so that one of them is in opposed relation to the phase of the signal received by the sense antenna, then the effect of that one signal will be eliminated. Thus, a feature of the present invention consists in feeding one control electrode of a dual control valve with a signal from a sense antenna feeding a second control electrode of said dual-control valve through a phase-changing device with the combined signal of the first two said electronic devices so that one of the components of the signal is in phase opposition to that provided by a sense antenna. The signal thus provided at the output of the dual-control valve may be passed to a receiver and thence to a detector circuit which will provide a low-frequency signal having a periodicity equal to that of the aforesaid A. C. supply and not double the frequency as in the case of the combined signal from the output of the two electronic devices.

In order to convert the sense signal to a form which will render inoperative one of the surges applied to the gas-discharge tube by the aforesaid combined signal, the sense signal, after being amplified by a suitable valve circuit, is applied to a selective transformer and the resulting signal from this transformer is applied to the input of an over-biased valve having a low screen potential, thereby providing an interrupted flat-topped curve, this signal and the signal resulting from the aforesaid two electronic devices and associated circuits are separately applied to two electrodes in a gas-discharge tube. The potentials of the two signals are such that alone they are unable to initiate a discharge. Since, however, the flat-topped surges will coincide with alternate hair-like surges, the potential differences between the electrodes at this point will be sufficient to initiate a discharge. Thus, if the gas-discharge tube is analyzed by a slotted shutter rotated by a synchronous motor driven by the first said A. C. supply, the position of the slots, when illuminated by the discharge, will give an indication of the direction of the incoming signal.

Means are provided for initially balancing the various circuits as set out hereafter in detail.

The following is a more detailed description of the above-mentioned circuits, reference being made to the accompanying drawings, in which—

Figure 2 is a repetition of that part of the circuit in Figure 1 between the receiver of the combined signals of the two electronic devices and the analysing device;

Figure 3 shows the various wave forms provided by the different components in the circuit of Figure 2;

Figure 4 shows an alternative series of components for producing the same wave forms as in Figure 3, and Figure 5 shows the wave form produced by the components in the circuit between the output of the receiver for the signals provided by the sense antenna and by the combined signals from the aforesaid two electronic devices.

Figure 1:
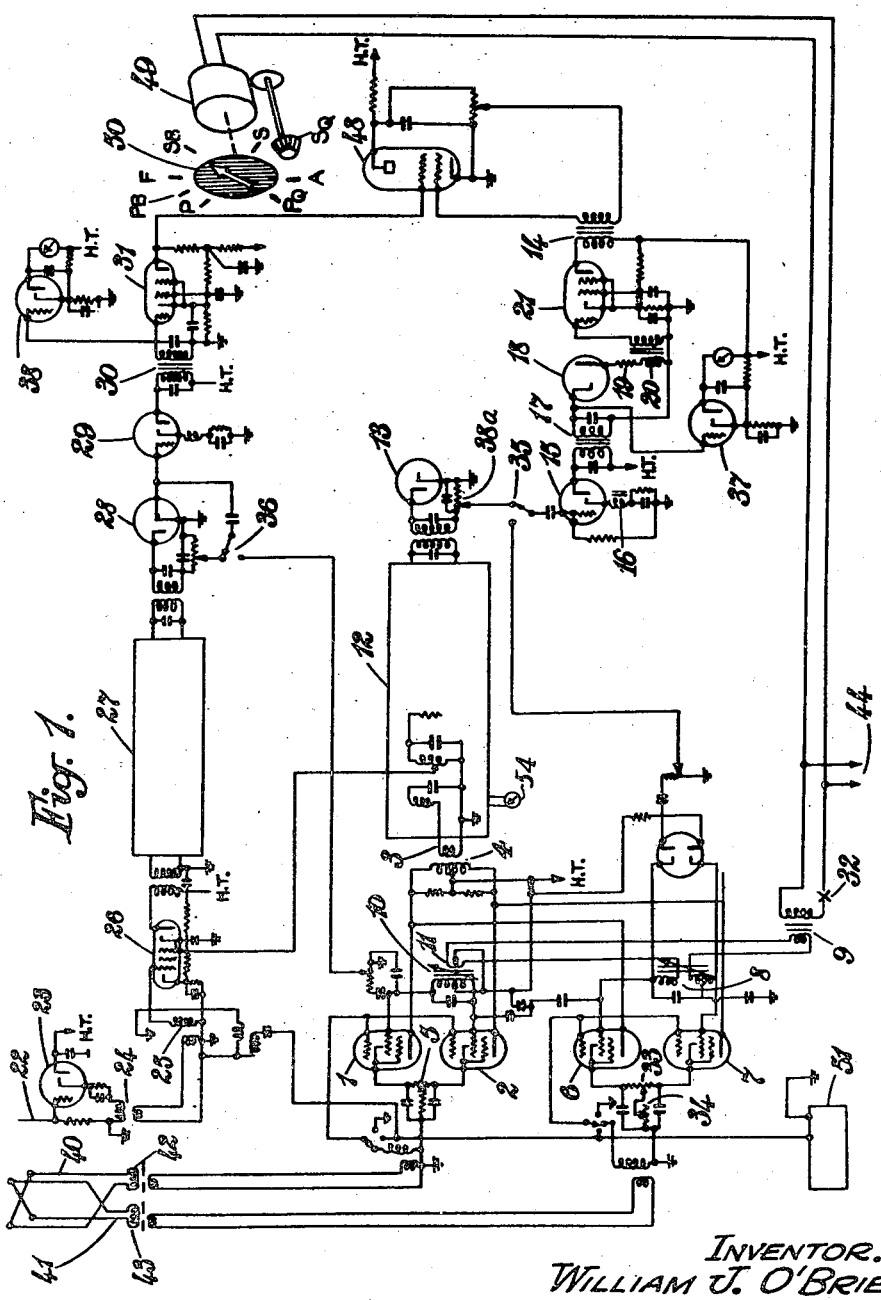
Figure 1 shows the general arrangement of the circuit.

The arrangement shown in the drawing provides a visual direction indicator suitable for use on a ship or aircraft for indicating the direction of an incoming radio signal. It comprises two crossed loop antennae 40 and 41 coupled by transformers 42 and 43 respectively to two thermionic devices about to be described.

The output from the transformer 42 is fed into the paralleled grids of the screened grid valves 1 and 2 which constitute one of the thermionic devices. The plates of these valves are fed push-pull to the secondary 3 of the transformer 4 which feeds the superheterodyne receiver 12. When the valves 1 and 2 are properly matched by adjusting the bias control 5, a signal fed on to the inputs of the valves will deliver no signal to the secondary 3 due to the fact that one valve is delivering energy of equal amplitude and of opposite phase to that delivered by the other, i. e., the outputs are balanced. If the screen voltages of the two valves are so arranged as to be increased on one while being decreased on the other the balance will be disturbed and a signal will be delivered to the secondary 3. A 180-degree phase change of the output signal will result when the condition of screen grid voltage unbalance is reversed. The unbalance of the screens is effected by applying A. C. signals of opposite polarity from an A. C. source 44 to each of the screens whereby the resulting signal delivered to the secondary 3 will be equivalent to that of the output of a conventional goniometer when the rotor or search coil is rotated at a speed equal to the frequency of the A. C. applied to the screens. If a pure sine wave A. C. signal is used the effect will be that of a zero error goniometer with only one stator coil energised.

To give the equivalent of the second stator coil of a goniometer another set of valves 6 and 7 constituting the second thermionic device are connected in a similar manner and have their inputs energised by the transformer 43 associated with the second loop 41 of the crossed loops and their outputs connected in parallel with the outputs of the first set of valves 1 and 3. If the phase of the A. C. signal applied to the screens of the second set of valves were identical to that of the first, the conditions would be equivalent in a conventional goniometer of aligning the two field coils in the same plane. To obtain the effect of crossed field coils the phase of the A. C. applied to the second set of valves is altered to be in phase quadrature to that applied to that of the first set. Any deviation from the phase quadrature relation would be equivalent in a goniometer to a misalignment of the angular displacement of the field coils, or the misalignment of the fixed loop aerials.

The A. C. signals for the screens of the pair of valves 6 and 7 is provided by the energisation of the balanced split inductance 8 which is arranged in a series resonant circuit connected to the secondary of the source transformer 9. The coupling between this resonant circuit and an equivalent resonant circuit or tuned secondary 10 is provided by a coupling coil 11. When the coupling coil 11 is adjusted to give optimum coupling and the resonant circuits properly tuned to resonance the resulting voltage of the two inductances 8 and that of the secondary 10 are equal and at phase quadrature. The tuning of this arrangement eliminates the harmonic content of the source of A. C. and thereby provides the desired pure wave form. The inductances used have iron cores provided with a rather large gap to provide both stability and optimum Q. The gaps are made adjustable to provide a means for tuning and phasing.

The modulated signal of winding 3 is amplified by the superheterodyne receiver 12 and detected by the diode 13. This diode and its associated circuit is also shown in Figure 2 which will be used to explain the circuit of Figure 1 from the diode 13 to the transformer 14. The wave form of the voltage output of the diode arrangement 13 is shown as $E_1$ in Figure 3 for a period of one cycle of the A. C. applied to the screens of the electronic goniometer valves. The signal $E_1$ is fed to the input of the amplifier valve 15. The low inductance 16 in the cathode circuit is merely a degenerative means for static or sharp pulses of interference. Past experience has shown that such degeneration is a more satisfactory eliminator of static than a filter as a filter leaves a greater low-frequency component which in this case is undesirable. The double tuned transformer 17 is tuned to the second harmonic of the A. C. signal and is energised by a valve 15. The filtered or selective output of transformer 17 is shown as $E_2$ in Figure 3. For reasons of selectivity the coupling coefficient of transformer 17 should be below optimum and the gap of the iron core chosen for maximum Q.

The output of transformer 17 is applied to a rectifier circuit comprising the diode 18, resistor 19 and transformer 20. The reactance of the primary of the transformer 20 at twice the A. C. frequency is made small compared to that of resistor 19. Under these conditions the voltage drop across the resistor is as shown by $E_3$ and the voltage across the secondary of the transformer is as shown by $E_4$. The transformer is connected so the primary and secondary voltages are in phase opposition.

The secondary signal from transformer 20 is fed to the input of valve 21. This valve is biassed to cut off which results in an anode current as shown by I in Figure 3. When the anode current is passed through a low inductance primary of a transformer 14 the resultant secondary voltage will be as shown by $E_5$ of Figure 3. The sharp hair-line surges of $E_5$ occur at the instant of time at which the voltage of $E_2$ crosses the zero line going from a negative to a positive value. These instants of time are marked on the $E_2$ curve by the lines X. Corresponding time markers are shown on the curve for $E_1$. It will be noted that the maximum and minimum voltages of $E_1$ correspond to the time position of maximum and minimum of the electronic or rotating goniometer. The time reference as given by $E_5$ lies midway between those two goniometer positions. In extreme conditions of minimum blurring caused by radio reflections or night effect the sharp minimum of $E_1$ will be rounded off and in the worst conditions will effect a signal of $E_1$, which approaches the sine wave shape of $E_2$. From this, it can be seen that the instrumental accuracy in indicating the exact direction of effective wave front is independent of the amount of minimum blurring. It naturally cannot correct for bearing error by any more than can be had by selecting the exact minimum centre by manual operation of a goniometer; it does however completely eliminate the human error of determining the minimum.

In Figure 4 is shown a circuit corresponding to Figure 2 in which capacity-resistance differentiating circuits 52 and 53 are used to replace the transformers 20 and 14.

Referring back to Figure 1, there is shown a sense antenna 22 coupled to a valve 23 which is mounted at the base of the antenna. The valve 23 feeds a coupling transformer 24. This valve and coupling transformer are used to provide a low impedance for the sense signal, thus permitting it to be transmitted over wires to the desired location without undue phase shift. The sense terminating transformer 25 is coupled to one control grid of a dual-controlled valve 26. The second control grid is coupled to the second coil of a duel-tuned R. F. selector energised by the winding 3. When the dual-tuned selector is properly tuned the phase of the signal on to the first control grid of valve 26 is in phase or phase-opposition to the signal applied to the second control grid. If the signal applied from the sense antenna is the greater of the two, the resultant signal of the output of valve 26 will be that of a modulated signal whose frequency of modulation is equal to the frequency of the A. C. applied to the screens of the electronic goniometer. When this signal is amplified by the receiver 27 and detected by the diode 28 a signal of the frequency of the A. C. will be delivered. This signal is amplified by the valve 29 and applied to the selective transformer 30. The signal output of the selective circuit is shown as $E_6$ in Figure 5. This signal is applied with sufficient strength to the input of an over-biassed valve 31 having a relatively low screen potential to cause overloading, thus effecting an output signal, as shown by $E_{g2}$ of Figure 5. The plate of valve 31 is directly connected to the second control grid of a gas-discharge tube 48. The plate supply voltage to the valve 31 is limited such as to prevent the signal from that valve from ionising the gas-discharge tube 48. The first control grid of the tube 48 is connected to the secondary of the transformer 14. It will be assumed that the ionisation potential between the grids of the discharge-tube 48 is 100 volts, then if the first grid is normally biassed to 50 volts and the anode supply to valve 31 is 140 volts the maximum potential difference between the grids during the operation of valve 31 will be 90 volts. The 90 volts difference is insufficient to flash the discharge-tube and no light will be emitted. When the signal from the transformer 14 comes into play the negative surge voltage will add to the difference sufficient to arc the discharge-tube 48. The voltage applied to the two control grids is shown as $E_{g1}$ and $E_{g2}$ in Figure 5. The bracket to the left shows the potential difference required to flash. It can be seen that a flash can occur only during alternate surge signals from transformer 14. This means that there is only one flash of light for each cycle of the A. C. signal. If this flash is used to illuminate a slotted indicator disc 50 rotating within a fixed compass annulus and driven by a synchronous motor 49 operating off the A. C. a steady indication will be given. The indication will be altered by a change in the time phase of the flash.

It will be appreciated that the resultant signal from the two electronic devices is similar to that provided by a rotating search coil of a conventional goniometer, the circuit for producing the hair-line voltage surges for the gas-discharge tube and the circuit associated with the sense antennae for cutting out alternate surges are applicable to such a conventional goniometer.

The following method may be used to synchronise and balance the system:

The input to the pair of valves 1 and 2 is switched into a test oscillator 51 while the second pair 6 and 7 have their inputs grounded. The balancing bias-control 5 is then adjusted to give a minimum signal at the output of the receiver 12, as indicated by an A. V. C. meter 54. The switch 32 is placed in the off position cutting the A. C. energisation of the screens before this operation is begun. When the valves 1 and 2 are thus balanced, the test oscillator is switched to the input of valves 6 and 7 and that of 1 and 2 is grounded. The balancing control 33 on these valves is adjusted in the same way. The switch 32 is then turned on applying the A. C. to the screens. The sense input is switched into the test oscillator through a network giving a 90-degree phase shift. The indicator will now be in operation and assuming that the valves 6 and 7 are coupled to the forward-aft loop the frame of the synchronous motor should be rotated until the indicator gives an exact forward reading. The test oscillator 51 is then switched off from valves 6 and 7 and onto the valves 1 and 2. This should shift the indicator to either port or starboard, depending on the direction of phase shift selected to be applied to the sense by the test oscillator phase shift network. If the indication is not exactly starboard or port, the inductance of screen feeding coil 10 is adjusted by means of varying the gap to make it so. The test oscillator is then switched onto the valves 6 and 7, thus exciting both sets and the indication is to read starboard bow or port bow. The indication is made to read exact by adjusting the bias-control 34 of valves 6 and 7. The unit is then in complete adjustment and all switches are returned to normal. It is unlikely that these adjustments will need frequent checking. The voltage variations will have a slight effect on the drag of the synchronous motor and it is well to have a quick check on its phase synchronism. This check may be had by switching the inputs of the sense and bearing amplifiers into the reference signals derived from the A. C. These switches are shown as 35 and 36. The manner in which these reference signals are obtained is easily understood by inspection. When the the unit is aligned by means of the test oscillator as explained the switches 35 and 36 are thrown to reference and a note is made of the indication and thereafter the motor frame is rotated to that reference indication should an adjustment be made when throwing over to reference at any later time.

In normal operation the two receivers 12 and 27 would be ganged and the desired signal tuned in using the valve voltmeter 37 of the receiver 12 as an indicator. The volume control 38a would be used to adjust this level to approximately a predetermined level. The final tuning adjustment would be made, using the maximum reading of the valve voltmeter 38 of the sense amplifier 27. This reading will be maximum when the proper phase shift is had for the signal feeding the second control grid of the mixer valve 26 of the sense amplifier. It is believed, however, that sufficient mis-phasing of the sense signals may be tolerated so as to require no better than usual tuning.

It might be pointed out that quadrantal errors which are sometimes corrected by means of increasing the sensitivity of one of the crossed loops may in the case of the electronic goniometer be corrected by merely adjusting the two pairs of valves to a given difference in gain. Such a correction is made by the bias-control 34. To fix this adjustment the test oscillator signals fed to each of the goniometer inputs are made unequal by the corrective amount.

Slight mis-matching or unbalance between the valves 1 and 2 or between the valves 6 and 7 will cause no error. Referring to Figure 3, such unbalance will cause each alternate bump of $E_1$ to have a different maximum. While this effect will displace the minimums it will not displace the maximums which is the controlling factor in determining the time-phase of the sine curve $E_2$.

When the selective transformers 17 and 30 are tuned up an oscillograph should be used to fix the surge $E_{g1}$ of Figure 5 to be centrally located with respect to $E_{g2}$, as shown in Figure 5. It should be noted, any shift in the frequency of the A. C. will cause errors due to the resulting phase shift of the various networks. While it might be possible to work out the constants of the various elements such as to cause compensating phase shifts for A. C. frequency changes and thus permit a reasonable shift of frequency it is probably much better to concentrate on means for supplying a fixed frequency. The 50-cycle mains would unquestionably be a satisfactory source. It is the portable or D. C. operated units that would require attention relative to the A. C. signal stability.

I claim:

1. A radio direction-finder comprising two fixed receiving antennae arranged with their directional properties in a required angular relationship, two electronic devices, means for applying high-frequency signal potentials built up in the two antennae respectively to the control electrodes of said electronic devices, means for generating two low-frequency A. C. signals of identical frequency but out-of-phase to a degree corresponding to said angular relationship of the two antennae, means for applying the two out-of-phase A. C. signals respectively to said electronic devices so as to modulate the high-frequency signals, each of which electronic devices is arranged to provide a reversal of phase of the modulated signal due to reversal of polarity of the applied A. C. signal, means for combining the resulting out-of-phase modulated outputs of the electronic devices, a gas-discharge tube having ionisation control elements connected by a suitable circuit with the combined output of the two electronic devices so as to produce ionisation voltage surges as varying phase-time points in said combined signal according to the relative amplitude of the two high-frequency signals, and means driven in synchronism with the A. C. supply and illuminated by the gas-discharge tube so as to indicate in a stroboscopic manner the positions of the surges in each cycle.

2. A radio direction-finder comprising two fixed receiving antennae arranged with their directional properties in a required angular relationship, two electronic devices, means for applying high-frequency signal potentials built up in the two antennae respectively to the control electrodes of said electronic devices, means for generating two low-frequency A. C. signals of identical frequency but out-of-phase to a degree corresponding to said angular relationship of the two antennae, means for applying the two out-of-phase A. C. signals respectively to said electronic devices so as to modulate the high-frequency signals, each of which electronic devices is arranged to provide a reversal of phase of the modulated signal due to reversal of polarity of the applied A. C. signal, means for combining the resulting out-of-phase modulated outputs of the electronic devices, a circuit embodying a detector valve circuit arranged to demodulate said combined output so as to produce a low-frequency signal of continuous form and of single polarity, a second circuit coupled to said first embodying an amplifier and a filter circuit which passes the required A. C. frequency, but eliminates the statics, thereby producing a double polarity sinuous wave, a third circuit coupled to said second and embodying a detector which provides a single polarity interrupted wave of rounded form, a differentiating circuit coupled to said third and embodying a transformer and amplifier which converts the interrupted rounded wave into a double polarity interrupted wave having sharp cut-off points at the commencement and at the end of each half-cycle joined by a curve with inflections, a valve coupled to said differentiating circuit biassed to cut-off so as to eliminate the half-waves of one polarity, another differentiating circuit coupled to said last named valve for converting half-waves to fine hair-line surges, a gas-discharge tube having ionisation control elements connected by a suitable circuit with the output of said other differentiating circuit so as to produce ionisation voltage surges at varying phase-time points according to the relative amplitude of the two high-frequency signals, and means driven in synchronism with the A. C. supply and illuminated by the gas-discharge tube so as to indicate in a stroboscopic manner the positions of the surges in each cycle.

3. A radio direction-finder comprising two fixed receiving antennae arranged with their directional properties in a required angular relationship, two electronic devices, means for applying high-frequency signal potentials built up in the two antennae respectively to the control electrodes of said electronic devices, means for generating two low-frequency A. C. signals of identical frequency but out-of-phase to a degree corresponding to said angular relationship of the two antennae, means for applying the two out-of-phase A. C. signals respectively to said electronic devices so as to modulate the high frequency signals, each of which electronic devices is arranged to provide a reversal of phase of the modulated signal due to reversal of polarity of the applied A. C. signal, means for combining the resulting out-of-phase modulated outputs of the electronic devices, a circuit embodying a detector valve circuit arranged to demodulate said combined output so as to produce a low-frequency signal of continuous form and of single polarity, a second circuit coupled to said first embodying an amplifier and a filter circuit which passes the required A. C. frequency, but eliminates the statics, thereby producing a double polarity sinuous wave, a third circuit coupled to said second and embodying a detector which provides a single polarity interrupted wave of rounded form, a differentiating circuit coupled to said third and embodying a transformer and amplifier which converts the interrupted rounded wave into a double-polarity interrupted wave having sharp cut-off points at the commencement and at the end of each half-cycle joined by a curve with inflections, a valve coupled to said differentiating circuit biassed to cut-off so as to eliminate the half-waves of one polarity, another differentiating circuit coupled to said last named valve for converting half-waves to fine hair-line surges, a gas-discharge tube having a pair of ionisation control elements one of which is connected by a suitable circuit with the output of said other differentiating circuit so as to produce ionisation voltage surges at varying phase-time points according to the relative amplitude of the two high-frequency signals, a sense antenna, electronic means coupling said sense antenna to the other of said ionisation control elements to thereby render alternate ones of said surges ineffective to ionise said gas-discharge tube, and means driven in synchronism with the A. C. supply and illuminated by the gas-discharge tube so as to indicate in a stroboscopic manner the positions of the surges in each cycle.

4. A radio direction-finder comprising two fixed receiving antennae arranged with their directional properties in a required angular relationship, two electronic devices, means for applying high-frequency signal potentials built up in the two antennae respectively to the control electrodes of said electronic devices, means for generating two low-frequency A. C. signals of identical frequency but out-of-phase to a degree corresponding to said angular relationship of the two antennae, means for applying the two out-of-phase A. C. signals respectively to said electronic devices so as to modulate the high-frequency signals, each of which electronic devices is arranged to provide a reversal of phase of the modulated signal due to reversal of polarity of the applied A. C. signal, means for combining the resulting out-of-phase modulated outputs of the electronic devices, a sense antenna, a dual control valve, means for feeding one control electrode of said dual-control valve with a signal from said sense antenna, a phase changing device, means for feeding a second control electrode of said dual-control valve through said phase-changing device with said combined signal from the first two electronic devices, so that one of the components of the signal is in phase opposition to that provided by the sense antenna, a gas-discharge tube having ionisation control elements connected by a suitable circuit with the output of said last named valve so as to produce ionisation voltage surges at varying phase-time points according to the relative amplitude of the two high-frequency signals, and means driven in synchronism with the A. C. supply and illuminated by the gas-discharge tube so as to indicate in a stroboscopic manner the positions of the surges in each cycle.

5. A radio direction-finder comprising two fixed receiving antennae arranged with their directional properties in a required angular relationship, two electronic devices, means for applying high-frequency signal potentials built up in the two antennae respectively to the control electrodes of said electronic devices, means for generating two low-frequency A. C. signals of identical frequency but out-of-phase to a degree corresponding to said angular relationship of the two antennae, means for applying the two outof-phase A. C. signals respectively to said electronic devices so as to modulate the high-frequency signals, each of which electronic devices is arranged to provide a reversal of phase of the modulated signal due to reversal of polarity of the applied A. C. signal, means for combining the resulting out-of-phase modulated outputs of the electronic devices, a sense antenna, an amplifying valve circuit for amplifying the signal from the sense antenna, a selective transformer coupled to the output of said amplifying valve circuit, an over-biassed valve having a low-screen potential, means coupling said transformer to the input of said over-biassed valve to thereby produce an interrupted flat-topped output, a gas-discharge tube having a pair of ionisation control elements one of which is connected by a suitable circuit with the combined output of the two electronic devices, so as to produce ionisation voltage surges at varying phase-time points in said combined signal according to the relative amplitude of the two high-frequency signals, means coupling the output of said over-biassed valve to the other of said ionisation control elements to thereby render alternate ones of said surges ineffective to ionize said gas discharge tube, and means driven in synchronism with the A. C. supply and illuminated by the gas-discharge tube so as to indicate in a stroboscopic manner the positions of the surges in each cycle.

WILLIAM JOSEPH O'BRIEN.

REFERENCES CITED

The following references are of record in the file of this patent:

UNITED STATES PATENTS

| Number | Name | Date |
| --- | --- | --- |
| 2,156,297 | Kruesi | May 2, 1939 |
| 2,184,306 | Kruesi | Dec. 26, 1939 |
| 2,274,546 | Hugenholtz | Feb. 24, 1942 |